United States Patent [19]
Freize et al.

[11] 3,837,431
[45] Sept. 24, 1974

[54] PULSED METERING LUBRICATOR

[75] Inventors: Ronny G. Freize, Gastonia, N.C.; George R. Ferguson, Clover, S.C.

[73] Assignee: G. W. Murphy Industries, Inc., Houston, Tex.

[22] Filed: Sept. 11, 1972

[21] Appl. No.: 287,707

[52] U.S. Cl. .............................. 184/7 D, 184/55 A
[51] Int. Cl. ............................................. F16n 7/30
[58] Field of Search ......... 184/7 D, 55 A, 56 A, 76, 184/82

[56] References Cited
UNITED STATES PATENTS

| | | |
|---|---|---|
| 2,497,822 | 2/1950 | Martin et al. .................... 184/55 A |
| 3,297,106 | 1/1967 | Hanson et al. .................... 184/55 A |
| 3,581,845 | 6/1971 | Nederynen ......................... 184/7 D |
| 3,587,782 | 6/1971 | Russell et al. ...................... 184/7 D |
| 3,595,342 | 7/1971 | O'Leary ............................. 184/56 A |
| 3,715,013 | 2/1973 | Lyth et al. ......................... 184/7 D |

*Primary Examiner*—Manuel A. Antonakas
*Attorney, Agent, or Firm*—Parrott, Bell, Seltzer, Park & Gibson

[57] ABSTRACT

A cyclically operated pressure fluid actuated device is lubricated by an apparatus which dispenses measured quantities of lubricant into a pressure fluid conduit supplying the device on each increase in pressure in the conduit.

1 Claim, 3 Drawing Figures

PATENTED SEP 24 1974
3,837,431
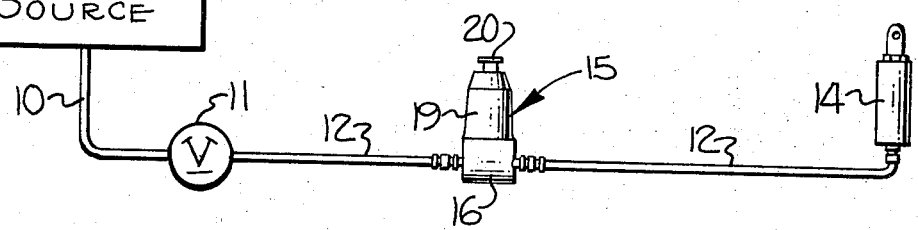
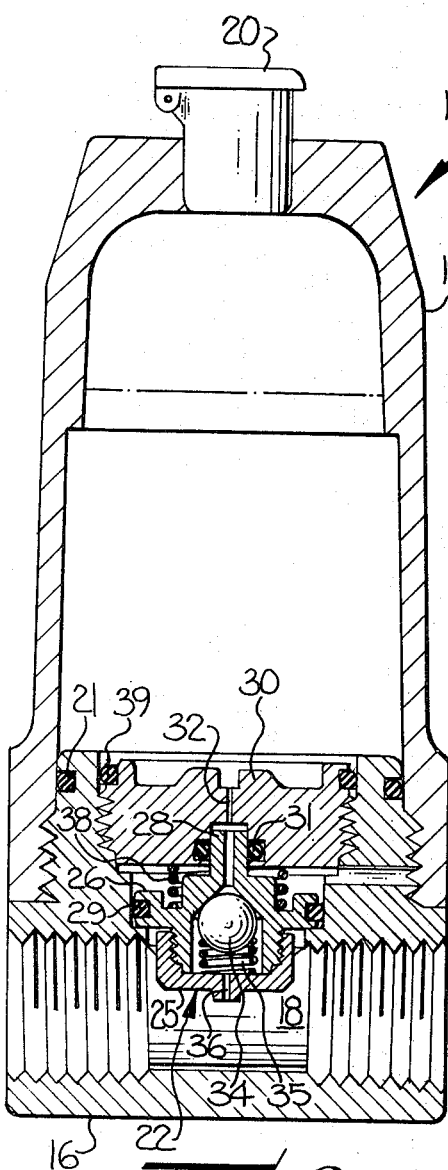
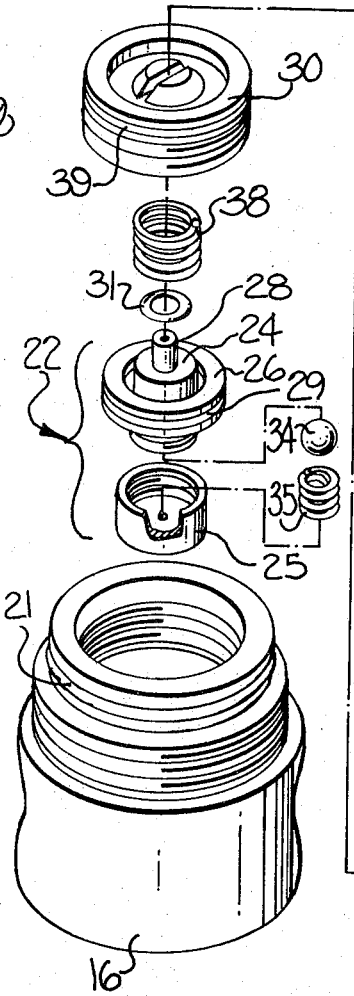

PULSED METERING LUBRICATOR

It has long been recognized that pressure fluid actuated devices such as compressed air cylinders, motors and the like operate more efficiently and have longer productive life where a lubricant is provided for the moving parts of such devices. Heretofore, a supply of lubricant to a relatively continuous flow device such as a compressed air motor has been accomplished by various forms of spray or wicking lubricators which continuously deliver lubricant into pressure fluid conduits supplying such devices. The lubricant is then conveyed by the flowing pressure fluid to the device to be lubricated.

In instances where the device supplied is cyclically operated, such as where a cylinder is supplied with pressure fluid from time to time to perform a particular machine function, such continuous supply of lubricant introduces serious difficulties and deficiencies. In particular, excess lubricant accumulates in the conduit and cylinder, interferes with proper operation of the cylinder and requires disassembly of the pressure fluid apparatus for cleaning.

It is an object of the present invention to dispense lubricant into a pressure fluid conduit supplying a cyclically operated device as the lubricant is needed while avoiding accumulation of excess lubricant in the conduit. In realizing this object of this invention, lubricant is delivered into a pressure fluid conduit upon each increase in pressure in the conduit, to be carried by the flow of pressure fluid to the device to be lubricated.

Yet a further object of this invention is to individually lubricate a cyclically operated pressure fluid actuated device at a location adjacent the individual device. In realizing this object of the present invention, the lubricator of this invention is constructed and arranged for adaptation to an individual device to be lubricated. More particularly, the lubricator is constructed to facilitate installation in close proximity to a device to be supplied and to permit adjustment of the quantity of lubricant delivered in coordination with the size of the device supplied.

Some of the objects and advantages of the invention having been stated, others will appear as the description proceeds, when taken in connection with the accompanying drawings, in which FIG. 1 is a schematic diagram of a pressure fluid system incorporating the lubricator of this invention;

FIG. 2 is an elevation view, in section, through the lubricator of this invention; and FIG. 3 is an exploded perspective view of the lubricator of FIGS. 1 and 2.

The lubricator of this invention will be described hereinafter with particular reference to the accompanying drawing, which shows the best form presently contemplated for this invention. However, it is to be understood at the outset that the description and drawing are for purposes of illustration only, as it is contemplated that variations in detail may be made within the broad scope of this invention. For that reason, the description and drawing are to be taken broadly and not restrictively.

Conventional pressure fluid systems, such as compressed air systems, include a source of the pressure fluid. In the instance of a compressed air system, the pressure source (such as schematically illustrated in FIG. 1) is an air compressor. In the illustrated system, compressed air flowing from the pressure source passes through a conduit 10 to reach a control valve 11. The control valve 11, by cyclical opening and closing, controls the delivery of compressed air into a delivery conduit 12, to ultimately reach a pressure fluid actuated device such as a cylinder 14. Particularly in the instance of a cylinder, it is conventional to alternately deliver and exhaust pressure fluid, to bring about desired cyclical operation.

In accordance with this invention, a lubricator generally indicated at 15 is interposed in the delivery conduit 12 for dispensing lubricant thereinto and thereby lubricating the piston which moves within the cylinder 14. While the arrangement schematically illustrated in FIG. 1 is simplified for clarity, it is to be understood that it is preferred that each cylinder supplied by a pressure fluid system have a corresponding lubricator 15 located closely adjacent thereto.

The lubricator 15 has a head block means 16 having a passageway 18 extending transversely therethrough (FIGS. 2 and 3). By the provision of female threaded portions in the passageway 18, the head block 16 is arranged to receive threaded connectors or couplings and thereby accomplish interposition of the lubricator 15 in the conduit 12. Thus, the passageway 18 defines a portion of the pressure fluid conduit through which compressed air is delivered to the cylinder 14.

Attached to the head block 16 is an inverted cup member 19 which defines a lubricant reservoir means for receiving and retaining a quantity of lubricant to be dispensed. Preferably, a capped fill inlet 20 is provided to permit ready sealing of the lubricant reservoir and the inverted cup member 19 is formed of a transparent material to permit ready visual inspection of the level of lubricant retained in the reservoir. Sealing of the inverted cup member 19 to the head block 16 is accomplished by an O-ring 21 mounted in the head block 16.

In order to pump lubricant from the lubricant reservoir into the conduit, a piston means generally indicated at 22 is mounted in the head block 16 for pumping movement relative thereto in response to fluctuations in fluid pressure in the conduit 12. The piston means 22 is exposed to pressure fluid passing through the passageway 18 so that the compressed air in the passageway acts directly on the piston means 22.

Piston means comprises a main piston body 24 and a secondary piston body 25 threadingly engaged with the main piston body 24. Pumping movement of the piston means 22 is guided by a lower seal flange portion 26 and an upwardly projecting nib 28 of the main piston body 24. The flange portion 26 receives a sealing O-ring 29 which engages a recess formed within the head block 16 so as to guide the piston means 22 in reciprocating movement (up and down in FIG. 2). The recess portion of the head block 16 has a step adjacent the passageway 18, to limit the extent of movement of the piston means 22 toward the passageway 18 (FIG. 2).

The nib 28 of the main piston body 24 enters into a recess formed in a stroke limiting stop member 30 which threadingly engages the head block 16. The nib 28 is sealed and guided in reciprocating movement by an O-ring 31 disposed within the recess which receives the nib. Additionally, upward movement of the piston means 22 is limited by the upper termination of the recess in the stop member 30.

As will be noted from FIG. 2, the stop member 30, secondary piston member 25 and main piston member 24 all are provided with aligned passageways therethrough, by which operative communication is established between the lubricant reservoir and the passageway 18. With movement of the piston means 22, pumped lubricant is passed from the reservoir into a trap chamber means and then from the trap chamber means into the passageway 18.

In particular, the trap chamber means is defined between the piston member 22 and the stop member 30 and has a volume which varies with vertical reciprocating movement of the piston means 22. Lubricant is pumped into the trap chamber means through a capillary passageway 32 in the stop member 30. Lubricant is pumped from the trap chamber means by passage about a ball valve member 34 normally retained in seated position against the main piston member 24 by a spring 35. Lubricant pumped past the ball valve member 34 is dispensed into the passageway 18 through an outlet passageway 36 in the secondary piston member.

In operation, the piston means 22 of the lubricator 15 assumes the position shown in FIG. 2 when the pressure has been exhausted from the cylinder 14 and supply conduit 12. The piston means 22 is urged toward the passageway 18 by a biasing spring 38 acting between the stop member 30 and the main piston member 24. Upon opening of the valve 11 to admit compressed air to the supply passageway 12, such compressed air acts directly on the piston means 22 to urge the piston means upwardly. With such upward movement of the piston means 22, lubricant contained within the variable volume trap chamber must either flow by the ball valve member 34 and be dispensed or return to the lubricant reservoir through the capillary passageway 32 in the stop member 30. Due to the small size of the capillary passageway 32, substantially all of the lubricant retained in the trap chamber is dispensed.

Upon the next following exhausting of compressed air from the cylinder 14 and the supply conduit 12, the piston means 22 moves toward the passageway 18 under the biasing force of the spring 38 and the force of gravity. With such movement of the piston means 22, lubricant is drawn from the reservoir through the capillary passageway 32 into the trap chamber, to prepare the lubricator for dispensing lubricant on the next increase in pressure in the passageway 12.

The stroke of the piston means 22 may be adjusted by adjusting the position of the stop member 30. Due to the threaded engagement of the stop member 30 with the head block 16 (sealed by an O-ring 39), rotation of the stop member will move the stop member toward or away from the passageway 18. With movement of the stop member 30 away from the passageway 18, the stroke of the piston 22 is enlarged, the trap chamber defined thereby is enlarged, and the quantity of lubricant delivered is increased. Thus, the lubricator of this invention may be adapted to pressure fluid actuated devices of varying sizes.

In the drawings and specification, there has been set forth a preferred embodiment of the invention, and although specific terms are employed, they are used in a generic and descriptive sense only and not for purposes of limitation.

That which is claimed is:

1. A lubricator for dispensing lubricant into a pressure fluid conduit supplying a cyclically operated pressure fluid actuated device and comprising:

head block means having a passageway for defining a portion of the pressure fluid conduit and a recess extending at right angles to said passageway, lubricant reservoir means for receiving and retaining a quantity of lubricant to be dispensed, said reservoir mean being attached to said head block means and encircling said recess, piston means mounted in said recess in said head block means for pumping movement transversely of said passageway and said conduit in response to fluctuations in fluid pressure within said conduit, said piston means being exposed to pressure fluid passing through said portion of said conduit, stroke limiting means mounted within said recess for limiting the extent of pumping movement of said piston means and movable relative to said head block means for adjustment of the extent of such pumping movement, said head block means, said piston means and said stroke limiting means together defining a variable volume trap chamber means and cooperating for pumping lubricant into and out of said trap chamber means, said stroke limiting means being penetrated by a passageway establishing operative communication between said reservoir means and said trap chamber means for passing a pumped lubricant into said trap chamber means, and said piston means being penetrated by passageways establishing operative communication between said trap chamber means and said portion of said conduit for dispensing pumped lubricant into pressure fluid flowing therethrough.

* * * * *